United States Patent [19]
Bishop

[11] Patent Number: 6,154,509
[45] Date of Patent: Nov. 28, 2000

[54] DATA PHASE RECOVERY SYSTEM

[75] Inventor: Wendell Bishop, Somerville, Mass.

[73] Assignee: Natural MicroSystems Corp., Framingham, Mass.

[21] Appl. No.: 09/008,646

[22] Filed: Jan. 16, 1998

[51] Int. Cl.[7] ...................................................... H04L 7/00
[52] U.S. Cl. .......................... 375/371; 370/517; 713/400; 713/401
[58] Field of Search .................................... 375/371, 355, 375/359, 360; 370/517, 518, 519; 713/400, 401

[56] References Cited

U.S. PATENT DOCUMENTS

| | | | |
|---|---|---|---|
| 4,965,814 | 10/1990 | Yoshida et al. | 375/111 |
| 4,996,444 | 2/1991 | Thomas et al. | 307/269 |
| 5,293,626 | 3/1994 | Priest et al. | 395/550 |
| 5,594,762 | 1/1997 | Joo et al. | 375/371 |
| 5,671,259 | 9/1997 | Thomas et al. | 375/371 |
| 5,790,612 | 8/1998 | Chengson et al. | 375/373 |
| 5,946,712 | 8/1999 | Lu et al. | 711/167 |

*Primary Examiner*—Stephen Chin
*Assistant Examiner*—Mohammad Ghayour
*Attorney, Agent, or Firm*—Mintz, Levin, Cohn, Ferris, Glovsky and Popeo

[57] ABSTRACT

Apparatus and method for processing serial data signals. In one general aspect, the method features receiving a first serial data signal having a clock frequency and phase, detecting a phase characteristic of the first serial data signal, and delaying the first serial data signal based on the phase characteristic of the first serial data signal to align at least one point in the first serial data signal with at least one point in a system clock signal.

11 Claims, 6 Drawing Sheets

DATA PHASE RECOVERY SYSTEM

FIELD OF INVENTION

This invention relates to systems for multiplexing several serial data input channels onto a single serial data output channel.

BACKGROUND OF THE INVENTION

It is known to time-multiplex data signals from several serial data input channels onto a single serial data output channel. In such applications, the signals on each of the input and output channels consist of a single serial stream with binary data represented by two different voltage levels. The clock for the binary data is generally expected to be recovered from the timing of the transitions between adjacent zero and one data bits in the input signals, even though the clock for each input channel is independent of that of the other channels. In these kinds of applications, the time multiplexing can include accepting data during a given "active" time period from one of the input channels and presenting it to the output channel, and then providing a "guard" period during which idle data is provided on the output channel before proceeding to the "active" period for the subsequent channel.

In other prior art systems, a clock signal is recovered from each of the input channels in turn, and this recovered clock signal is used to drive the data transitions on the output channel. In such systems, guard periods are used as a transition time during which the phase of the clock for the active period prior to the guard period is gradually adjusted to match the phase of the clock for the active period subsequent to the guard period. Such systems can present a clock frequency jitter on the output channel when the clock recovered from each of the input channels is at a different frequency. Even when all of the input channels are at the same frequency, a clock phase jitter can exist on the output channel when the clock recovered from each of the input channels has a different phase.

SUMMARY OF THE INVENTION

In one general aspect, the invention features a clock recovery circuit that includes a data input line, a system clock line, and a sync detector having a data input responsive to the data input line and having sync detection signal output. A variable delay element has a clock input responsive to the system clock, a sync detection input responsive to the detection signal output of the sync detector, a data input responsive to the data input line, and a data output.

The sync detector can be operative to employ discrete oversampling on an input data signal received on the data input line to provide noise immunity by requiring multiple identical oversamples both prior to and after a transition on the input data signal. A shift register can have a serial input line responsive to the data input line, have a plurality of taps, and be clocked at an oversampled data rate, with the variable delay element being responsive to the taps and being operative to apply the phase delay by selecting a signal from one of the taps for output at the data output. The sync detector can be a combinatorial circuit responsive to a plurality of shift register taps to generate the sync detection signal output. The sync detector can include means for voting for ones of a plurality of candidate signals to generate the sync detection signal. The delay element can be operative to introduce a delay of between about one-half and one and one-half clock cycles of the system clock. The circuit can further include a multiplexer having a plurality of inputs each operatively connected to one of a plurality of separately-clocked serial input lines and having an output line operatively connected to the data input line. The sync detector can be operative to detect a transition on the data input line.

In another general aspect, the invention features a clock recovery circuit that includes means for time-multiplexing responsive to a plurality of input signal lines to time-multiplex a plurality of input signals received on the plurality of input signal lines into a plurality of time slots, and means responsive to the time-multiplexing means for individually delaying the signals within their respective time slots by different amounts based on individual characteristics detected from each of the signals received from the means for time-multiplexing.

The means for delaying can also be responsive to a system clock to align each of the signals to the system clock. The means for delaying can be operative to delay each of the signals by between about one-half and one and one-half clock signals from the system clock. The means for delaying can be responsive to transitions in the signals received on each of the input signal lines to delay each of the signals by a different amount. The means for delaying can include means for detecting a transition to determine a duration of the delay. The means for delaying can include means for voting for one of a plurality of candidate signals to determine a duration of the delay.

In a further general aspect, the invention features a method of processing serial data signals that includes receiving a first serial data signal having a clock frequency and phase, detecting a phase characteristic of the first serial data signal, and delaying the first serial data signal based on the phase characteristic of the first serial data signal to align at least one point in the first serial data signal with at least one point in a system clock signal.

The received serial data signal can be oversampled with a multiple of the system clock signal. The step of detecting the phase characteristic can operate by detecting a number of identical oversamples both before and after a transition in the serial data signal. The method can further include the steps of receiving a second serial data signal that has a clock frequency and phase that differ from those of the first serial data signal, detecting a phase characteristic of the second serial data signal, and delaying the second serial data signal based on the phase characteristic of the second serial data signal to align at least one point in the second serial data signal with at least one point in a system clock signal, wherein an amount of delay introduced by the step of delaying the second serial data signal is different from an amount of delay introduced by the step of delaying the first serial data signal. The method can further include the steps of receiving further serial data signals that each have a clock frequency and phase that differ from those of the first serial data signal, with the step of receiving the first serial data signal and the steps of receiving further serial data signals each taking place during a separate time slot, multiplexing between the first serial data signal and the further serial data signals, detecting a phase characteristic of the further serial data signals, and delaying the further serial data signals based on the phase characteristic of the second serial data signals to align at least one point in each of the further serial data signals with at least one point of a system clock signal, wherein amounts of delay introduced by the steps of delaying the further serial data signals are different from an amount of delay introduced by the step of delaying the first serial data signal. The step of detecting a phase characteristic can include detecting a transition in the first serial data signal. The step of detecting a phase characteristic can include a step of voting. The step of delaying can be operative to delay the first serial data signal by between about one-half and one and one-half system clock signal periods.

Systems according to the invention can present a multiplexed output signal on their output channels with arbitrarily small clock frequency and phase jitter. Because this frequency and phase output jitter can be made to be independent of any input jitter, frequency and phase jitter characteristics are under control of the designer of the clock and recovery circuit. A system architect can therefore design a circuit whose output satisfies arbitrary jitter specifications, even if it is to be used in the presence of a significant amount of frequency and phase jitter on its inputs.

These performance improvements can be available without requiring improvements in the precision, accuracy, or stability of components, which might otherwise be required to avoid compounding errors on the input channels. This can reduce the cost of such components and in some instances may allow for the use of less expensive technologies to implement a circuit with similar or better frequency and phase jitter.

The improvements in jitter specifications available from the invention generally have little adverse impact on the circuit employing them. The maximum delay introduced by one embodiment of the clock recovery circuit is one and one-half bit periods, which is negligible in many applications. And the clock recovery circuit can be implemented in a relatively simple and inexpensive logic circuit.

DESCRIPTION OF ILLUSTRATIVE EMBODIMENT

Figure 1:
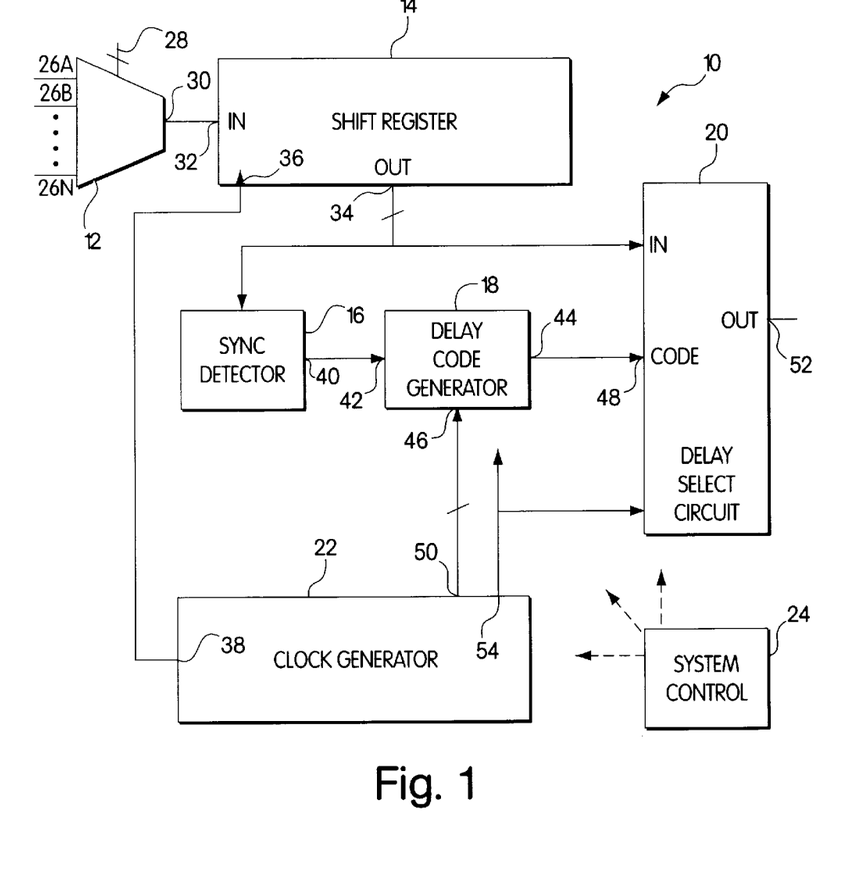
FIG. 1 is a block diagram of a multiplexing and clock recovery circuit according to the invention.

Referring to FIG. 1, a multiplexing and clock recovery circuit 10 according to the invention includes a multiplexer 12, a shift register 14, a sync detector 16, a delay code generator 18, a delay select circuit 20, a clock generator 22, and system control circuitry 24. The multiplexer has a number of data inputs 26A, 26B . . . 26N that are each connected to one of a series of serial communication channels. A select control port 28 allows the multiplexer to select one of these inputs and pass it through to an output 30.

The output 30 of the multiplexer 12 is operatively connected to a serial input 32 of the shift register 14. The shift register also has a parallel output port 34 that is provided both to the sync detector 16 and to the delay select circuit 20. It further includes a clock input line that is operatively connected to a sampling clock output line 38 of the clock generator 22. The sampling clock runs at a multiple of the nominal clock frequency received on the serial input lines (e.g., eight times the nominal input clock frequency).

The sync detector 16 has an output line 40 operatively connected to an input line 42 of the delay code generator 18. The delay code generator has an output port 44 operatively connected to a code input port 48 of the delay select circuit 20. The delay code generator 18 also has a clock input port 46 operatively connected to a clock output port 50 of the clock generator 22.

The clock generator has a receive clock output 54 in addition to those outputs already discussed. This receive clock output acts as the clock output for the circuit 10 and can be used to latch the output of the delay select circuit. It runs at the nominal data clock frequency present on the input lines.

The system control circuit 24 controls the operation of the circuit. It can be embodied in a dedicated control circuit or in a routine of a programmed processor such as an overall board-control processor. The control circuit has a number of control outputs that are provided to the various elements of the multiplexing and clock recovery circuit 10.

Figure 2:
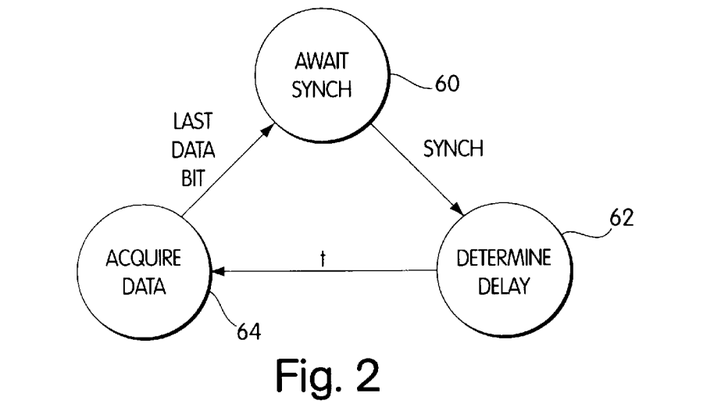
FIG. 2 is a state diagram for the circuit of FIG. 1.
Figure 3:
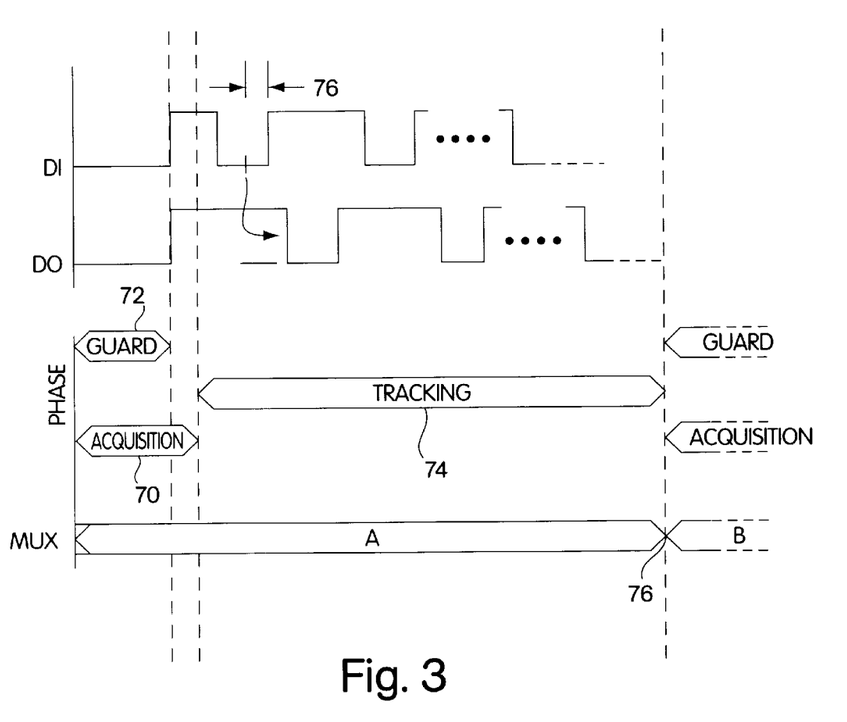
FIG. 3 is a timing diagram for the circuit of FIG. 1.
Figure 4A:
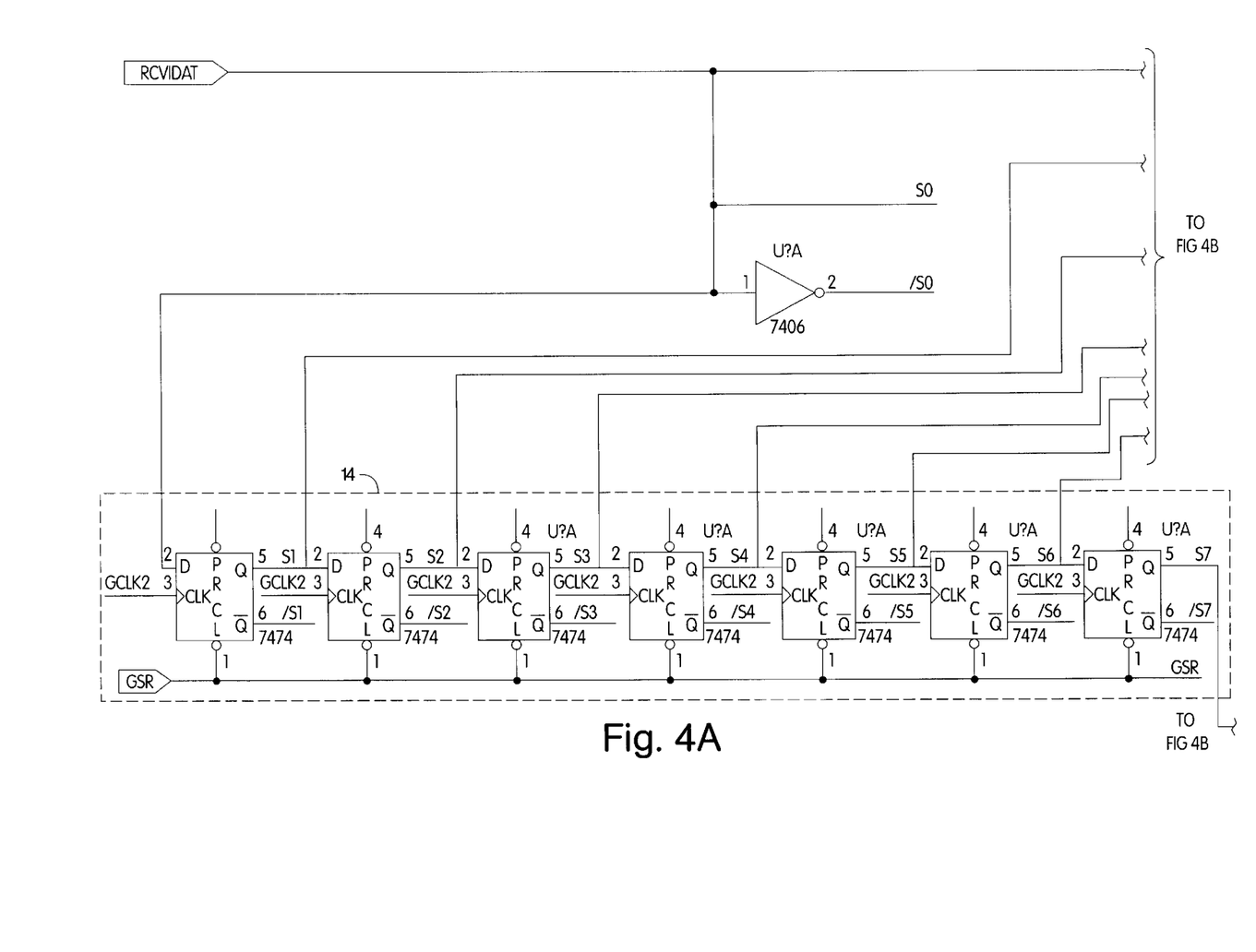
FIGS. 4A–4D are a logic diagram for an embodiment of the circuit of FIG. 1 beginning at the output of its multiplexer.
Figure 4B:
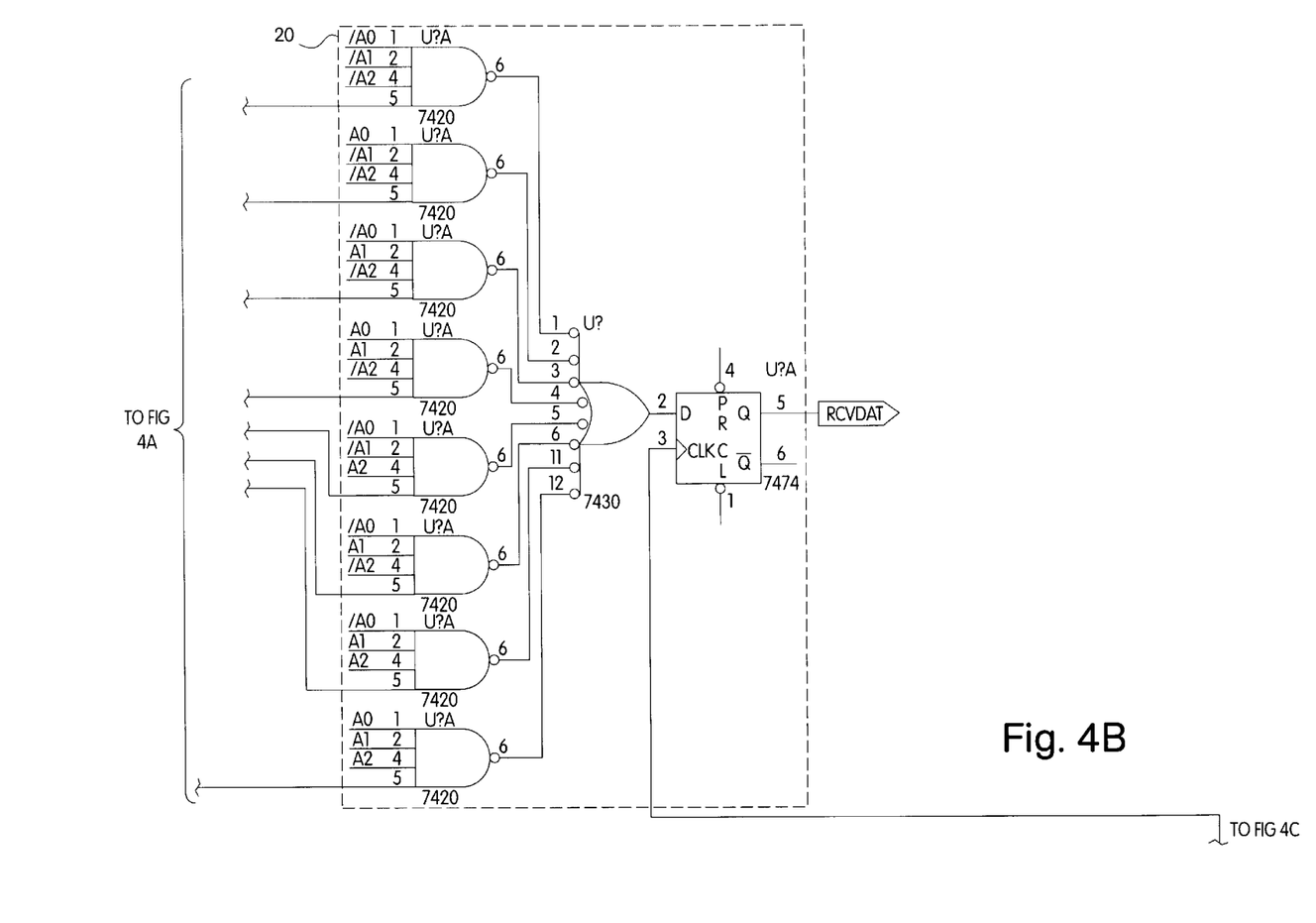
Figure 4C:
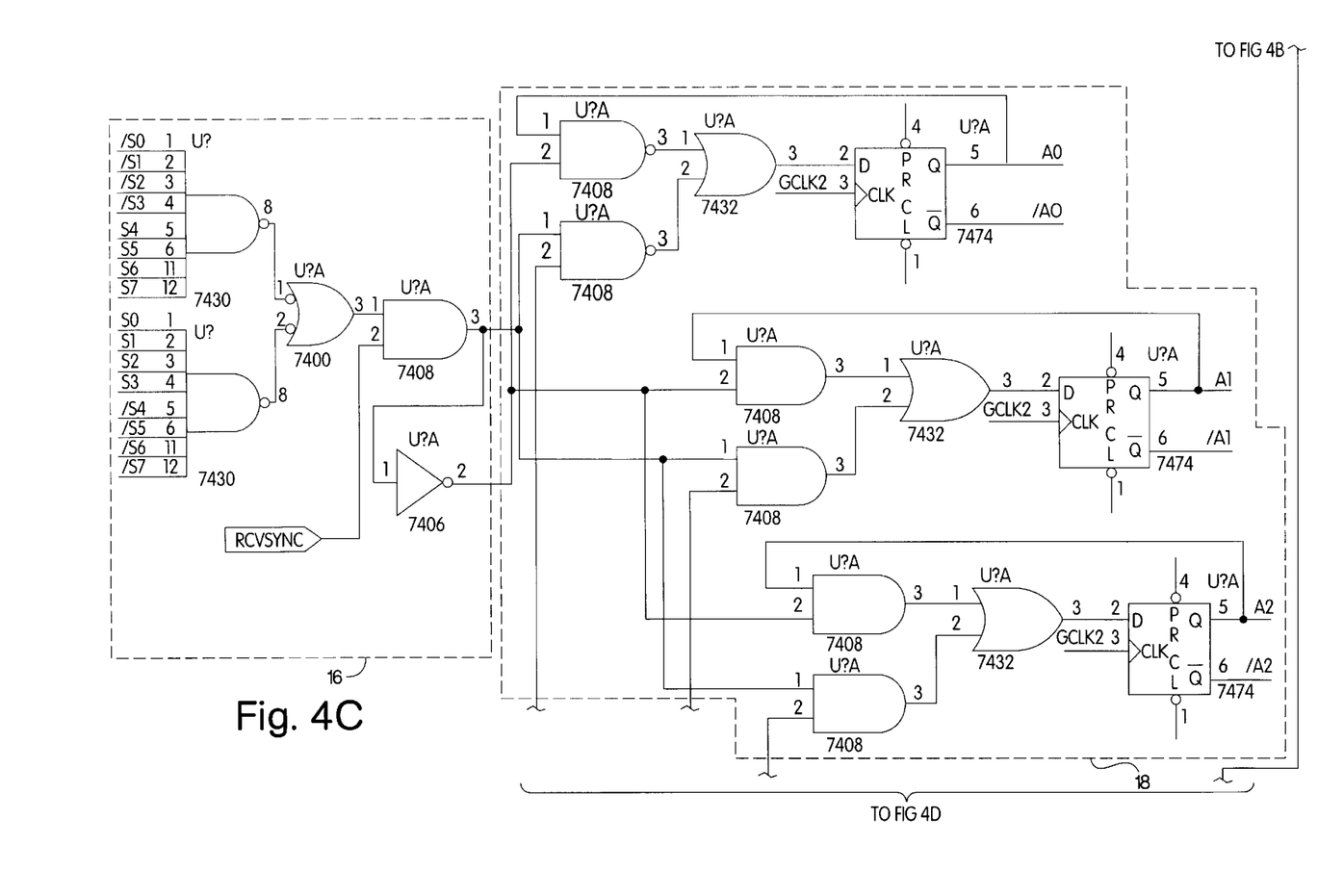
Figure 4D:
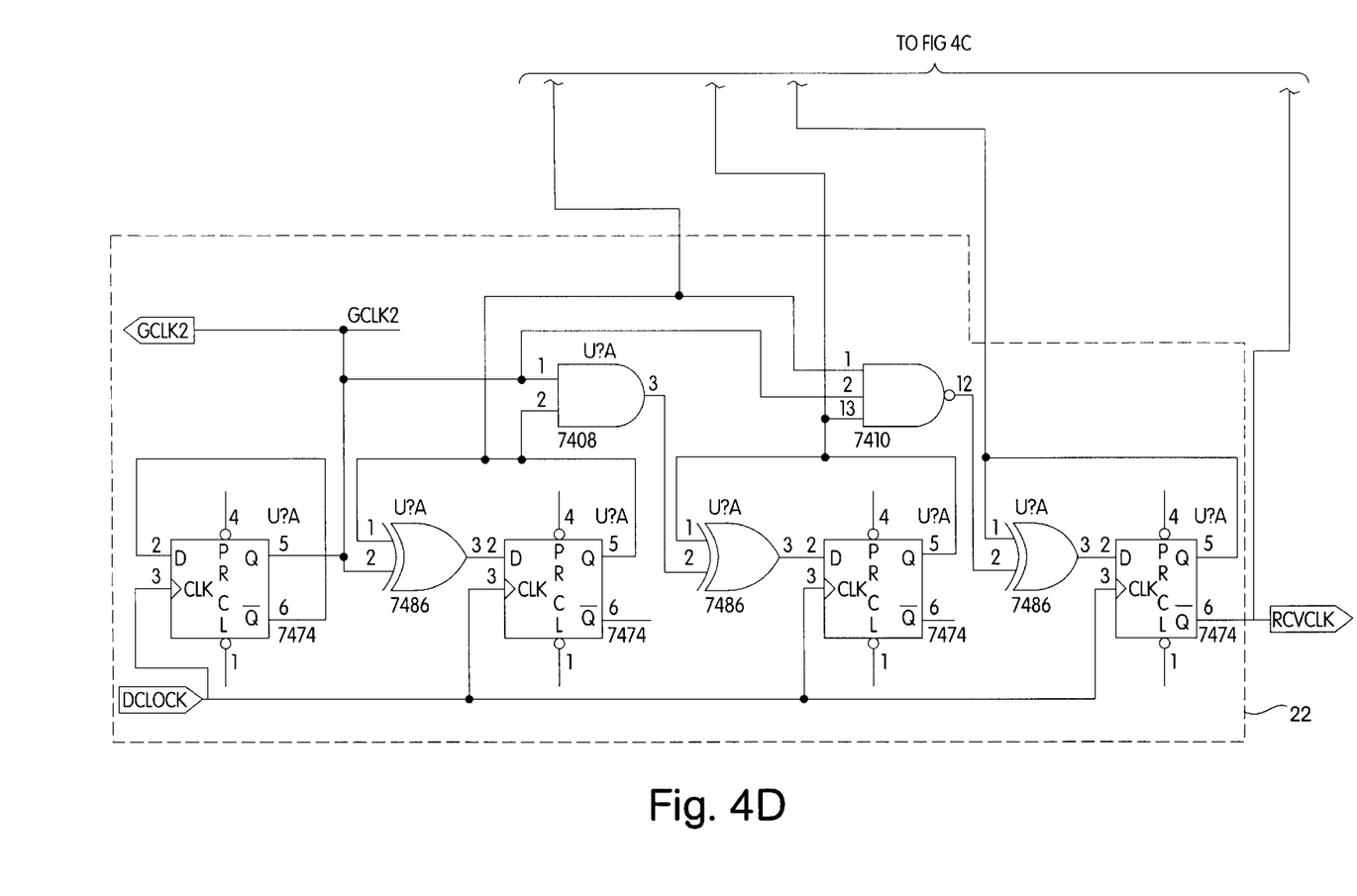

In operation, referring to FIGS. 1–3, the multiplexing and clock recovery circuit 10 begins by awaiting a sync code on a currently-selected serial input 26A (state 60). The sync detector 16 detects the sync code by waiting for a "clean transition" of the signal being sampled into the shift register. This can be done by searching for four low bits followed by four high bits or four high bits followed by four low bits, but the sync detector can also employ other strategies for detecting a sync code. For example, it may look for a different output code on the shift register taps or look at several transitions and choose the best one based on a voting strategy.

Upon detection of the first clean transition in the shift register, the sync detector will issue a sync detect signal on its sync detect output line 40, which signals the beginning of reception for that time slot. The delay code generator 18 will then generate a delay code based on this sync detect signal and the state of a number of clock signals received from the clock port 46. The delay select circuit provides on its output a version of the input signal that is delayed by an amount corresponding to the delay code (state 62). This output can be latched, which can introduce additional delay.

The delay code generator 18 produces a code that is designed to shift the phase of the input data so one point in a bit cycle in the input data, such as the beginning or mid point of a data bit from the shift register, is aligned with a corresponding point in the receive clock. This delay can range from zero to almost one bit period and is used for the rest of the data received during the time slot (state 64). Since the signal is sampled with a multiple of the receive clock as well as shifted in time by an appropriate amount, the output will be exactly synchronized with the receive clock.

For the implementations presented in FIG. 1 to be applicable, the clocks of all input channels should be close to some nominal frequency ("f(n)" in bits per second). More precisely stated, the deviation of the phase of the data transitions on the input channel from nominal over the active period must be less than one bit period. The deviation in phase is a combination of deviation in clock frequency from nominal and inherent jitter in the phase transitions of the data. Letting "f(x)" represent the actual frequency (in bits per second) of one such channel, letting the active period for that channel be represented as "T" in seconds, and letting the maximum jitter in the data clock during the period T be represented as a fraction of a bit, the requirement on the input channel can be stated algebraically as:

$$(|(f(x)-f(n))|xT)+(x)<1$$

To implement a robust system, this requirement should be made more strict, so that the deviation from nominal remains a small fraction of a bit.

The system of FIG. 1 generates a highly accurate clock at the nominal frequency. This clock is then used as the bit clock for the output channel and all bit transitions on the output channel are driven from this clock. The arbitrarily small phase and frequency of the output channel is determined by the accuracy of this clock, and not by any characteristics of the input channels.

Referring to FIGS. 1 and 3, the time period between the end of the data for one input channel 26N and the end of the data for the subsequent input channel 26A can be divided into two stages. The first stage, called an "acquisition stage" 70, includes a guard period 72 between input channels and the portion of the sync code at the beginning of the input data until the system recognizes the sync code. The second stage, called the "tracking stage" 74, lasts from the recognition of the sync code until the system determines that the input data for this period is complete. After the tracking stage for one input channel is complete, the system switches 76 to accepting input data from the next input channel 26B and enters another acquisition stage.

The system performs two basic functions. The first function is called "phase detection," and involves examining the input channel for bit transitions of the binary data and measuring the delay from one such transition to the next bit transition to be asserted on the output channel, to establish a "current delay value." This delay value will be shorter than one bit period of the output channel.

The second function is called "application of phase delay," and involves sampling the input channel at a point in time that precedes a bit transition on the output channel by a period equal to the current delay value 76 plus one half of a nominal bit period due to the output latch in the delay select circuit. The sampled value of the input channel DI is then asserted on the output channel DO for the full duration of the subsequent output bit period. This inserts an overall delay between the input channel data and the output channel data of between one-half and one and one-half bit periods.

During the acquisition stage, phase detection takes place and the current delay value is updated with each input channel data transition. At the end of the acquisition stage, the current delay value is frozen for the duration of the tracking stage. The application of phase delay occurs continuously throughout both the acquisition stage and the tracking stage. Note that even during the acquisition stage, there need not be a change in the current delay value due to phase detection if there have been no transitions in the input channel data. However, the sampling of the input channel inherent in the application of phase delay is performed between output bits for each output bit.

Referring to FIGS. 4A–4D, one particular embodiment of the circuit of FIG. 1 will now be discussed in more detail. The sync detector 16 can be implemented as a combinatorial circuit that detects a clean transition in the shift register 14. A clean transition is define in this circuit as shift register contents equal to either 00001111 or 11110000. The output of the sync detector is enabled by an enable signal RCVSYNC, which is asserted at the beginning of the guard period.

The delay code generator 18 is a combinatorial circuit with latched outputs. It receives the sync detect signal and the state of a number of clock signals from the clock generator 22. Based on these inputs, it generates and latches a delay code that it provides to the delay select circuit 20. The delay code can be a binary number equal to the delay value expressed as a number of sampling clock periods.

The delay select circuit 20 is another combinatorial circuit with an optional output latch clocked by the receive clock. It receives the signals on each of the parallel output lines of the shift register 14 and the delay code from the delay code generator 18. Based on these inputs, it latches either the signal output from the line of one of the stages of the shift register or the data input itself, depending on the delay required.

The clock generator 22 receives a clock signal DCLOCK and generates the sampling clock GCLK2, a receive clock RCVCLK 54, and a number of different clock phase signals, which are provided to the delay code generator 18. The clock generator can include a multi-stage counter with outputs from the individual stages acting as the clock phase signals. The receive clock is the reference signal that a circuit connected to the data output RCVDAT of data phase recovery circuit will use to clock the data signal it receives from the receiving circuit.

The purposes of the multiplexing and clock recovery circuit described above can be achieved in a number of different ways. The system constructed as shown in FIGS. 1 and 4 represents a dedicated circuit implementation, but one of skill in the art would also be able to implement other dedicated circuits that achieve the same purposes. It may also be possible to achieve the purposes of the circuit using a programmed processor architecture.

The data phase recovery system presented above in connection with FIGS. 1–4 can be included in a DECT wireless system. The DECT standard supports conversation with up to twelve handsets through a single RF transceiver unit by defining twenty-four equal timeslots in each 10 millisecond period. Twelve consecutive timeslots during half of the period (5 milliseconds) are reserved for data transferred from the base station to the handsets. The other twelve consecutive timeslots are reserved for data transferred from the handsets to the base station. The nominal data rate is 1.152 Mbps and the nominal size of each timeslot is 480 bits (about 417 microseconds). Of the 480 bits, 60 are reserved for a guard time between channels to account for differences in delays for handsets at different distances from the RF transceiver unit (and other factors such as tolerances permitted in handset construction). Of the 420 bits left, the first 32 are a sync code to demark the beginning of the input data. The remaining 388 bits are input data, whose content need not concern us further here.

In this particular embodiment, the transceiver unit is connected to a base station by twisted-pair wire up to several miles long carrying constant bit rate 1.152 Mbps data. The data passing from base station to transceiver and out to each handset is driven by a single clock in the base station. The data transferred from the handsets to the transceiver unit and on to the base station originate in the handsets, each of which is running from its own internal clock. In order to reliably transfer the data from the transceiver unit to the base station, the frequency and phase jitter of the data on the twisted pair wire must be kept very small. To ensure this condition, the data phase recovery system described above is implemented in the transceiver unit. In this configuration, the data from each handset to the transceiver unit are considered an input channel, and the data from the transceiver unit to the base station are considered the output channel.

The DECT standard requires that the clock used as a reference within each handset be accurate to within 25 parts per million (ppm) frequency of nominal. Furthermore, the standard permits no more than 0.1 microseconds of jitter between the start of the first bit of a timeslot and the start of any later bit of the same timeslot. Over the 420 active bits of the timeslot, the 25 ppm requirement ensures accuracy to within:

0.000025×420=0.0105 bit

The permitted jitter, restated as a fraction of a bit is:

0.1 microseconds×1.152 Mbps=0.1152 bit

Combining the phase deviation due to frequency inaccuracy with that due to permitted jitter gives a total expected maximum deviation throughout the timeslot of:

0.1152+0.0105=0.1257 bit

These requirements permit the application of the procedure used in the data phase recovery system described herein.

The DECT data phase recovery system uses a clock at eight times the nominal bit frequency (9.216 Mbps) to oversample the input data stream. The circuitry that performs data phase recovery is implemented within a single field programmable gate array, and includes a phase detection subsystem that first applies data transition detection to the oversampled input stream. This operation consists of examining the stream for either a sequence of four zero bits followed by four one bits, or a sequence of four one bits followed by four zero bits. The oversampling thereby applies the detection from one half bit time prior to the transition, to one half bit time after the transition. The oversampling provides noise immunity, and the overall system is not adversely affected if one or a few of the transitions during the sync code period are missed.

When a data transition is found, a simple counter at the oversampling clock rate is used to determine the current phase delay relative to the output channel transitions. During the acquisition stage, this counter value is transferred into a latch to retain its value until the next data transition is found. It is this latched value that is used by the subsystem which applies phase delay to the input data. During the tracking stage, the counter value is no longer transferred to the latch on detection of data transitions. This means that the last value latched during the acquisition stage is used for the duration of the tracking stage.

The oversampled input stream is fed to a serial shift register which is one bit period (eight oversamples) long. Applying phase delay is performed by simply using the latched current phase delay value at each predetermined bit transition time to select which tap of the shift register to use for the output channel. The delay value is transferred at that time to a single bit register, which is applied to the output for the duration of the bit period.

The transitions between the acquisition stage and the tracking stage are determined by a microcontroller subsystem outside the field programmable array. During the acquisition stage, this microcontroller examines the output data stream from the field programmable array, to find the sync code. Once the microcontroller finds the sync code, it causes the transition to the tracking stage. During the tracking stage, the microcontroller uses a timer to count bits of the output stream to decide when the tracking stage is done. The microcontroller then causes a transition back to the acquisition stage to wait for the next handset's input data. The selection of acquisition or transition stage is performed with a single control line from the microcontroller to the field programmable array.

The discrete oversampling technique for both determining the current phase delay and for applying this delay to the data stream can be accounted for by considering it to be additional jitter on the input data stream. In this case, the maximum additional jitter would be 0.25 bit. When this is combined with the previously determined maximum phase difference over a timeslot, the result is: which is still well within a single bit period for reliable system performance.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A clock recovery circuit, comprising:
   a data input line,
   a system clock line,
   a sync detector having a data input responsive to the data input line and having sync detection signal output wherein the sync detector is operative to employ discrete oversampling on an input data signal received on the data input line to provide noise immunity by requiring multiple identical oversamples both prior to and after a transition on the input data signal, and
   a variable delay element having a clock input responsive to the system clock, having a sync detection input responsive to the detection signal output of the sync detector, having a data input responsive to the data input line, and having a data output.

2. The circuit of claim 1, further including a shift register having a serial input line responsive to the data input line, having a plurality of taps, and being clocked at an oversampled data rate, wherein the variable delay element is responsive to the taps and is operative to apply a phase delay by selecting a signal from one of the taps for output at the data output.

3. The circuit of claim 1 further including a shift register having a serial input line responsive to the data input line and having a plurality of taps, wherein the sync detector is a combinatorial circuit responsive to a plurality of the taps to generate the sync detection signal output.

4. The circuit of claim 1 wherein the sync detector includes means for voting for ones of a plurality of candidate signals to generate the sync detection signal.

5. The circuit of claim 1 wherein the variable delay element is operative to introduce a delay of between about one-half and one and one-half clock cycles of the system clock.

6. The circuit of claim 1 further including a multiplexer having a plurality of inputs each operatively connected to one of a plurality of separately-clocked serial input lines and having an output line operatively connected to the data input line.

7. A method of processing serial data signals, comprising:
   receiving a first serial data signal having a clock frequency and phase, oversampling received first serial data signal with a multiple of a system clock signal,
   detecting a phase characteristic of the first serial data signal by detecting a number of identical oversamples both before and after a transition in the serial data signal, and
   delaying the first serial data signal based on the phase characteristic of the first serial data signal to align at least one point in the first serial data signal with at least one point in a system clock signal.

8. The method of claim 7 further including the steps of:
   receiving a second serial data signal that has a clock frequency and phase that differ from those of the first serial data signal,
   detecting a phase characteristic of the second serial data signal, and delaying the second serial data signal based on the phase characteristic of the second serial data signal to align at least one point in the second serial data signal with at least one point in a system clock signal, wherein an amount of delay introduced by the step of delaying the second serial data signal is different from an amount of delay introduced by the step of delaying the first serial data signal.

9. The method of claim 7 further including the steps of:

receiving further serial data signals that each have a clock frequency and phase that differ from those of the first serial data signal, the step of receiving the first serial data signal and the steps of receiving further serial data signals each taking place during a separate time slot, multiplexing between the first serial data signal and the further serial data signals, detecting a phase characteristic of the further serial data signals, and delaying the further serial data signals based on the phase characteristic of the second serial data signals to align at least one point in each of the further serial data signals with at least one point of a system clock signal, wherein amounts of delay introduced by the steps of delaying the further serial data signals are different from an amount of delay introduced by the step of delaying the first serial data signal.

10. The circuit of claim 7 wherein the step of detecting a phase characteristic includes a step of voting.

11. The circuit of claim 7 wherein the step of delaying is operative to delay the first serial data signal by between about one-half and one and one-half system clock signal periods.

* * * * *